US008562084B2

(12) United States Patent  
Chen

(10) Patent No.: US 8,562,084 B2
(45) Date of Patent: Oct. 22, 2013

(54) ENCLOSURE CORNER SEALS AND ASSEMBLIES

(75) Inventor: Simon Shen-Meng Chen, Palatine, IL (US)

(73) Assignee: Emerson Network Power, Energy Systems, North America, Inc., Warrenville, IL (US)

( * ) Notice: Subject to any disclaimer, the term of this patent is extended or adjusted under 35 U.S.C. 154(b) by 366 days.

(21) Appl. No.: 12/887,961

(22) Filed: Sep. 22, 2010

(65) Prior Publication Data

US 2012/0068586 A1  Mar. 22, 2012

(51) Int. Cl.
*A47B 95/00*  (2006.01)

(52) U.S. Cl.
USPC ........................................ 312/296; 312/223.1

(58) Field of Classification Search
USPC ........... 312/296, 265.1–265.4, 223.1; 52/657; 248/220.1; 49/501, 504; 211/26, 189
See application file for complete search history.

(56) References Cited

U.S. PATENT DOCUMENTS

| | | | | |
|---|---|---|---|---|
| 2,056,051 A | * | 9/1936 | Huntington | 220/592.07 |
| 2,172,458 A | * | 9/1939 | Shuart | 49/479.1 |
| 2,956,705 A | * | 10/1960 | Clingman | 220/683 |
| 3,165,793 A | * | 1/1965 | Lynch | 49/479.1 |
| 3,318,061 A | * | 5/1967 | Stentz | 52/288.1 |
| 3,334,175 A | * | 8/1967 | Vincent | 174/367 |
| 4,196,952 A | * | 4/1980 | Crowe | 312/236 |
| 4,513,554 A | * | 4/1985 | Johnson et al. | 52/657 |
| 4,544,069 A | * | 10/1985 | Cavallini | 211/183 |
| 5,020,866 A | * | 6/1991 | McIlwraith | 312/265.4 |
| 5,066,161 A | * | 11/1991 | Pinney | 403/172 |
| 5,250,752 A | * | 10/1993 | Cutright | 174/363 |
| 6,045,203 A | * | 4/2000 | Marks et al. | 312/228 |
| 6,112,469 A | | 9/2000 | Vuillemot et al. | |
| 6,315,132 B1 | * | 11/2001 | Hartel et al. | 211/26 |
| 6,530,630 B2 | * | 3/2003 | Austin et al. | 312/265.4 |
| 6,535,382 B2 | * | 3/2003 | Bishop et al. | 361/690 |
| 6,725,610 B2 | | 4/2004 | Murphy et al. | |
| 6,877,702 B1 | * | 4/2005 | Diggle et al. | 248/278.1 |
| 2001/0037988 A1 | * | 11/2001 | Knab et al. | 211/189 |
| 2002/0180322 A1 | * | 12/2002 | Liu et al. | 312/405 |
| 2004/0100041 A1 | * | 5/2004 | Palicki et al. | 277/640 |
| 2007/0257033 A1 | | 11/2007 | Yamada | |
| 2011/0050052 A1 | * | 3/2011 | Elkins et al. | 312/223.1 |
| 2012/0068586 A1 | * | 3/2012 | Chen | 312/223.4 |

FOREIGN PATENT DOCUMENTS

EP        0839983        5/1998

* cited by examiner

*Primary Examiner* — Janet M Wilkens
(74) *Attorney, Agent, or Firm* — Harness, Dickey & Pierce, P.L.C.

(57) ABSTRACT

A sealing assembly for sealing a corner of an enclosure is disclosed. The sealing assembly includes a substantially rigid bracket and a flexible seal. The bracket includes a first latch and a second latch. The first and second latches are configured for releasable connection to an enclosure adjacent a corner with the first and second latches on opposing sides of said corner. The bracket is configured to provide a force to couple the flexible seal to a corner of an enclosure when the bracket is attached to said enclosure. The flexible seal includes a first surface for coupling to the corner of the enclosure, and a second surface opposite the first surface. At least a portion of the second surface is configured for contact with the bracket. The flexible seal may include a connector for releasable connection to the bracket.

24 Claims, 15 Drawing Sheets

ENCLOSURE CORNER SEALS AND ASSEMBLIES

FIELD

The present disclosure relates to seals and seal assemblies for sealing corners of enclosures, including telecommunication enclosures.

BACKGROUND

This section provides background information related to the present disclosure which is not necessarily prior art.

Telecommunications enclosures are commonly used to house telecommunications equipment. The enclosures may be suited for use indoors or outdoors. Some known telecommunications enclosures are constructed by connecting (e.g., welding, gluing, fastening, etc.) separate enclosure components together. Various telecommunications enclosures including a frame made of a plurality of frame members are disclosed in U.S. patent application Ser. No. 12/552,045 filed Sep. 1, 2009, the entire disclosure of which is incorporated herein by reference. Various techniques have been used for sealing telecommunications enclosures against environmental (e.g., rain, dust, debris, etc.) intrusion into the enclosure.

SUMMARY

This section provides a general summary of the disclosure, and is not a comprehensive disclosure of its full scope or all of its features.

According to one aspect of the present disclosure, a sealing assembly for sealing a corner of an enclosure is disclosed. The sealing assembly includes a substantially rigid bracket and a flexible seal. The bracket includes a first latch and a second latch. The first and second latches are configured for releasable connection to an enclosure adjacent a corner of the enclosure with the first and second latches on opposing sides of the corner. The bracket is configured to provide a force to couple a flexible seal to the corner of the enclosure when the bracket is attached to the enclosure. The flexible seal includes a first surface for coupling to the corner of the enclosure, and a second surface opposite the first surface. At least a portion of the second surface is configured for contact with the bracket. The flexible seal includes a connector for releasable connection to the bracket.

According to another aspect of the present disclosure, a sealing assembly for sealing a corner of an enclosure includes a rigid bracket and a flexible seal. The rigid bracket includes a contact portion, a first attachment portion and a second attachment portion. The contact portion has an interior surface for orienting facing toward the corner of the enclosure and an exterior surface for orienting facing away from the corner of the enclosure when the sealing assembly is mounted to the enclosure. The interior and exterior surfaces are defined by a first arm coupled to a second arm. The first and second arms are generally planar shapes coupled to define an angle between the first arm and the second arm about the same as an angle defined by the corner of the enclosure to be sealed by the sealing assembly. The first attachment portion extends generally perpendicular from a first edge of the interior surface of the contact portion. The first attachment portion includes at least one latch for releasable attachment of the rigid bracket to the enclosure. The second attachment portion extends generally perpendicular from a second edge of the interior surface of the contact portion opposite the first edge of the interior surface of the contact portion. The second attachment portion includes at least one latch for releasable attachment of the rigid bracket to the enclosure. The flexible seal includes a contact portion including an interior surface for contacting the corner of the enclosure and an exterior surface for contacting the rigid bracket when the sealing assembly is mounted to the enclosure. The interior and exterior surfaces are defined by a first arm coupled a second arm. The first and second arms are generally planar shapes coupled to define angle between the first arm and the second arm about the same as an angle defined by the corner of the enclosure to be sealed by the sealing assembly. The flexible seal also includes an attachment portion extending generally perpendicular from a first edge of the interior surface of the contact portion. The attachment portion includes at least one connector for releasably coupling the flexible seal to the rigid bracket.

According to yet another aspect of the present disclosure, a telecommunications enclosure includes a plurality of frame members. At least two of the plurality of frame members are coupled together to define a corner of a doorframe of the telecommunications enclosure. The telecommunications enclosure includes a corner seal assembly coupled to the telecommunications enclosure to seal a gap in the corner of the doorframe. The corner seal assembly includes a flexible seal positioned in the corner and a rigid bracket coupled to the flexible seal and coupled to the at least two of the plurality of frame members adjacent the corner. The rigid bracket retains and compresses the flexible seal into the corner of the doorframe.

Some example embodiments of sealing assemblies and telecommunications enclosures incorporating one of more of these aspects are described below. Additional aspects and areas of applicability will become apparent from the description below. It should be understood that various aspects of this disclosure may be implemented individually or in combination with one or more other aspects. It should also be understood that the description and specific examples herein are provided for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
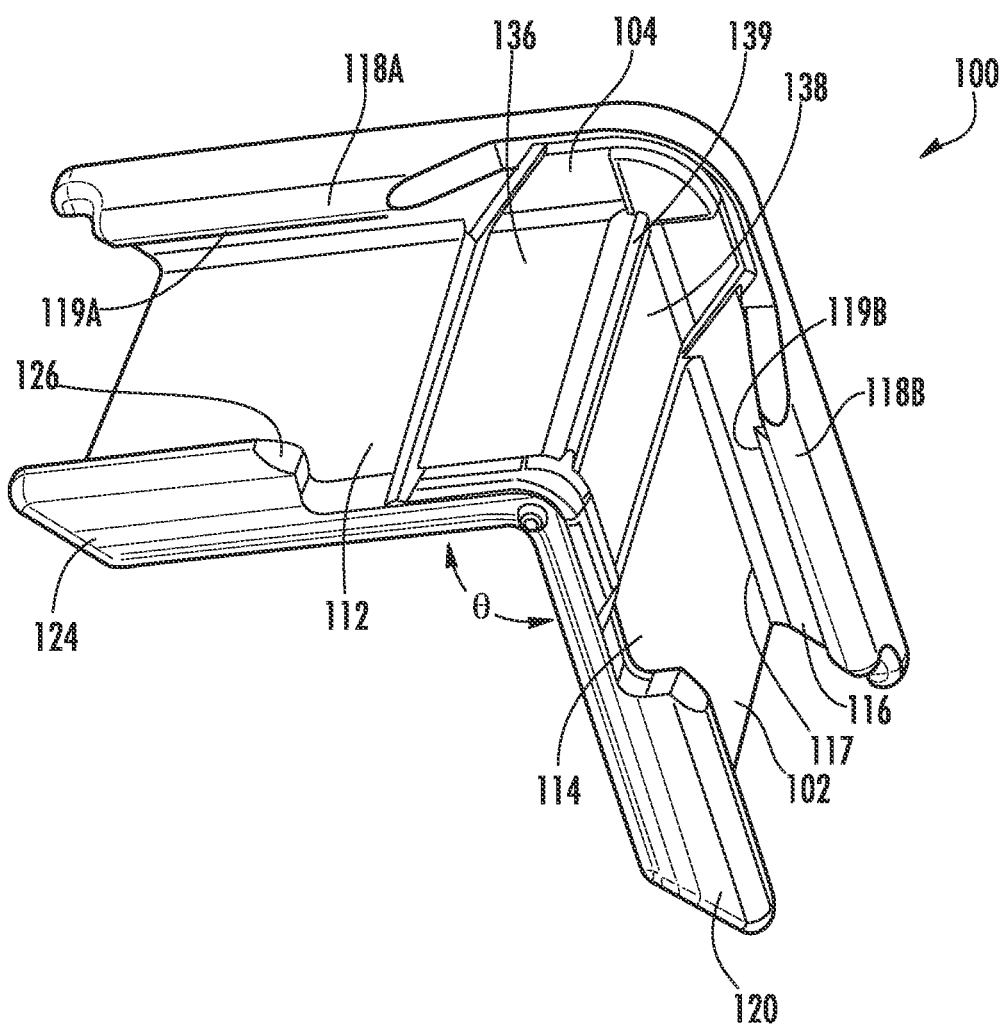
FIG. 1 illustrates an example sealing assembly according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to one aspect of the present disclosure, a sealing assembly for sealing a corner of an enclosure is disclosed. The sealing assembly includes a substantially rigid bracket and a flexible seal. The bracket includes a first latch and a second latch. The first and second latches are configured for releasable connection to an enclosure adjacent a corner of the enclosure with the first and second latches on opposing sides of the corner. The bracket is configured to provide a force to couple a flexible seal to the corner of the enclosure when the bracket is attached to the enclosure. The flexible seal includes a first surface for coupling to the corner of the enclosure, and a second surface opposite the first surface. At least a portion of the second surface is configured for contact with the bracket. The flexible seal includes a connector for releasable connection to the bracket.

The connector of the flexible seal may include at least one pin extending from the flexible seal. The bracket may include at least one aperture configured for receiving the pin. Alternatively, or additionally, the bracket may include a pin and the flexible seal may include an aperture to receive the pin. The flexible seal and the bracket may each include more than one pin and/or aperture. Alternatively, any other suitable connector for releasably connecting the seal and the bracket may be used.

The bracket and the flexible seal may each be monolithically formed, e.g., by casting, molding, machining, stamping, thermoforming, etc., or a combination thereof.

The bracket may be formed of any suitable material. In various example embodiments, the bracket may comprise a plastic. The bracket may be formed of a plastic such as, for example, nylon 66, COEP A66, etc. Alternatively, any other suitable plastic material may be used to form the bracket.

The flexible seal may be formed of any suitable sealing material. In exemplary embodiments, the flexible seal is formed of an elastomer. For example, the flexible seal may be formed of santoprene or any other suitable soft, compliant material.

Figure 2:
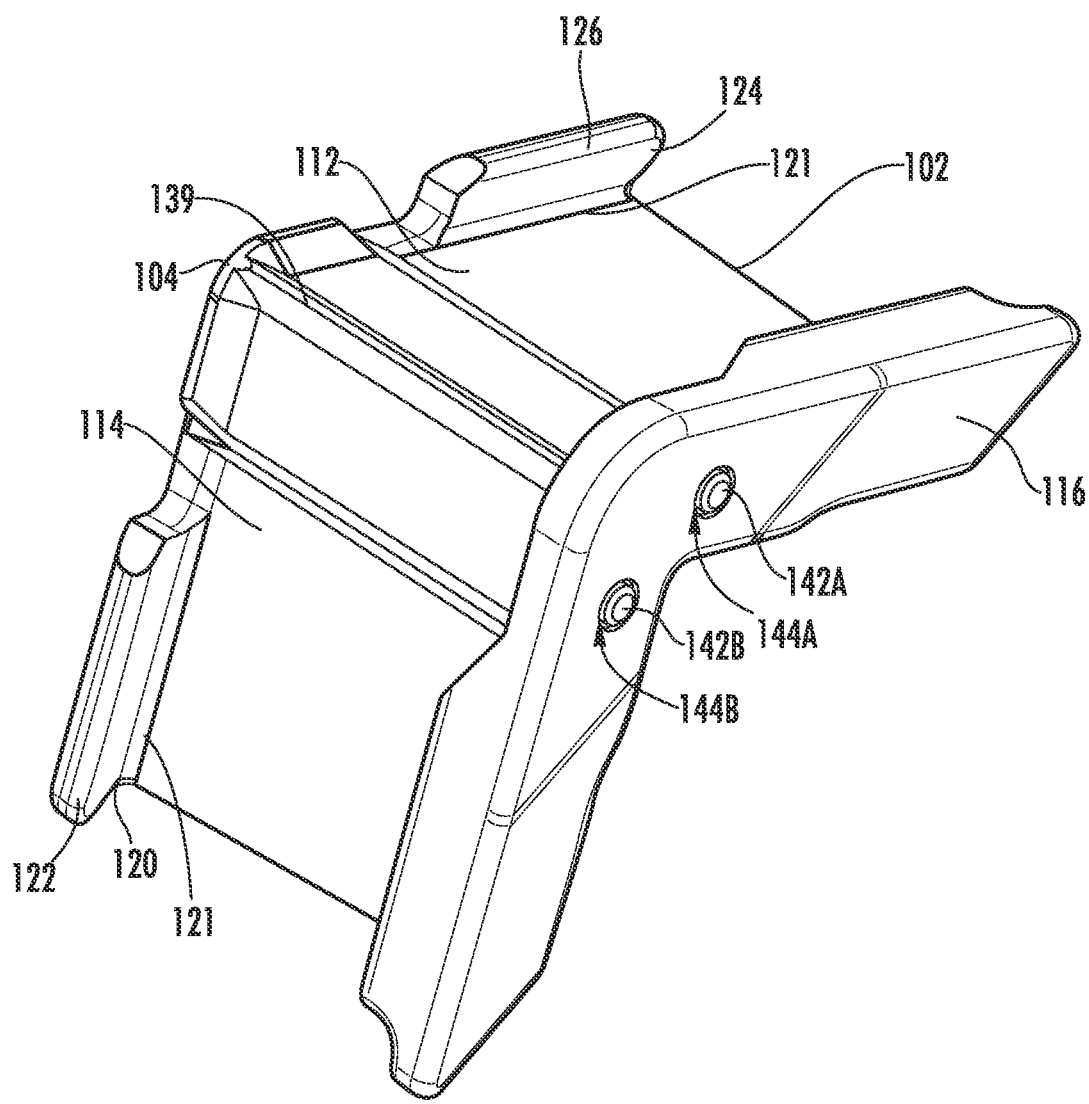
FIG. 2 is a front, top isometric view of the example sealing assembly of FIG. 1.
Figure 3:
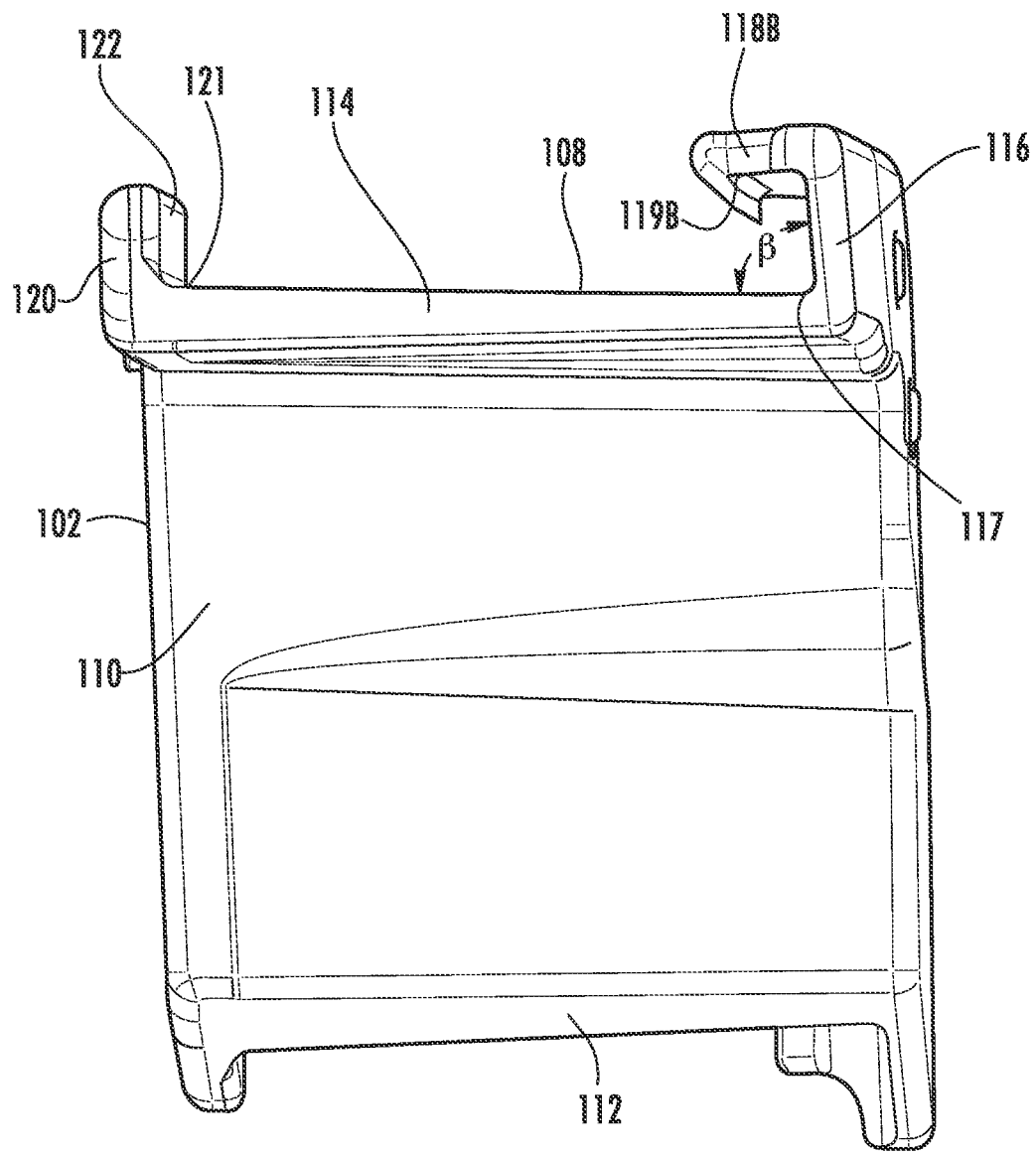
FIG. 3 is side, end view of the example sealing assembly of FIG. 1.
Figure 4:
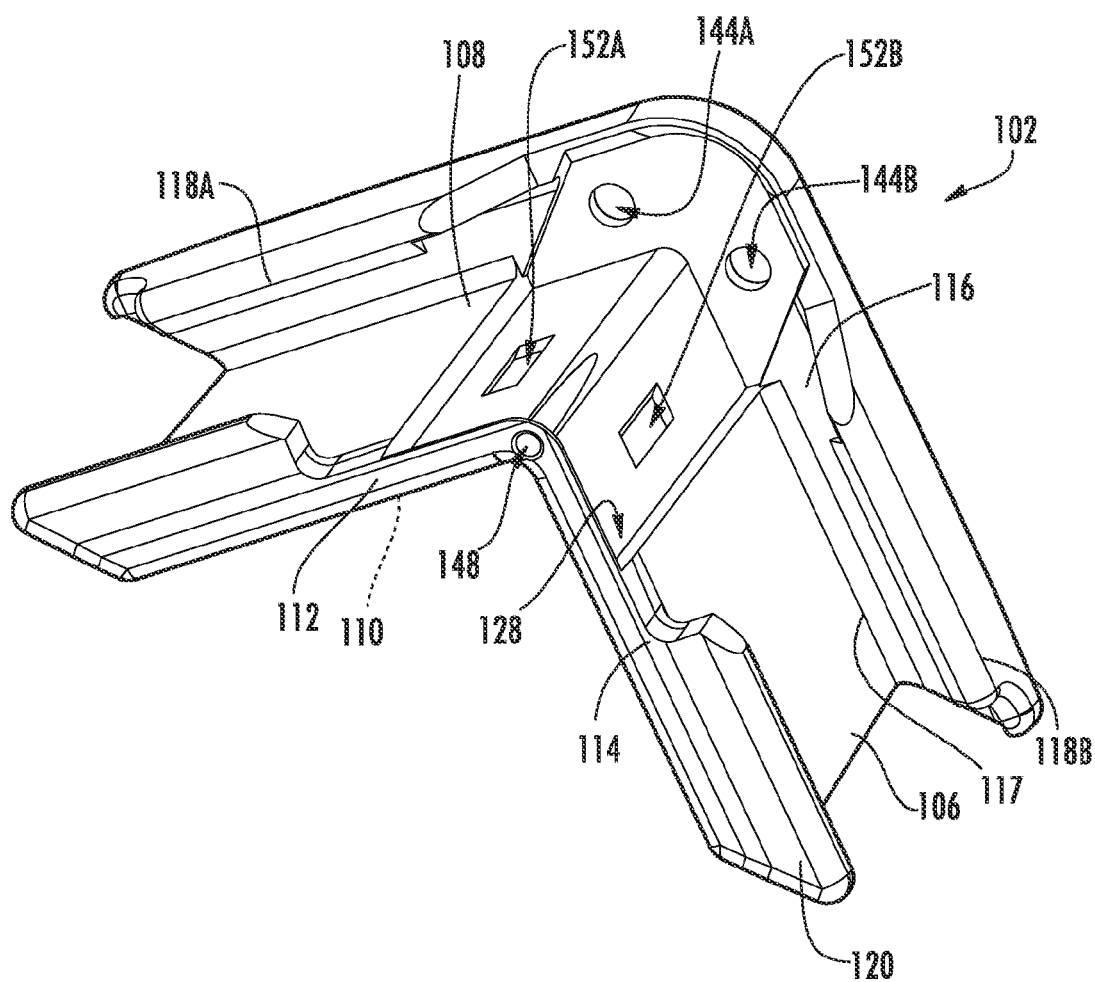
FIG. 4 is a rear, top isometric view of the bracket of the example sealing assembly of FIG. 1.

An example embodiment of a sealing assembly, generally indicated by reference numeral 100, will be described with reference to FIGS. 1-6. The sealing assembly 100 is shown in FIGS. 1-3. The sealing assembly 100 includes a bracket 102 and a seal 104. FIG. 4 shows the bracket 102 without the seal 104. The seal 104 is shown without the bracket 102 in FIGS. 5 and 6.

As show in FIG. 4, the bracket 102 includes a contact portion 106. The contact portion 106 includes an interior surface 108 and an exterior surface 110. The interior surface 108 is the surface that will be oriented facing toward a corner of an enclosure when the bracket 102 is attached to the enclosure, while the exterior surface 110 is the surface that will be oriented facing away from such corner.

The interior surface 108 and the exterior surface 110 are defined by opposite sides of a first arm 112 and a second arm 114. The first and second arms 112, 114 are generally planar shapes coupled together to define an angle θ (as indicated in FIG. 1) between the first arm 112 and the second arm 114. The angle θ is about the same as an angle defined by a corner of an enclosure to be sealed by the sealing assembly 100. Accordingly, for example, if a corner of an enclosure defines an angle of about 90 degrees, the angle θ may be about 90 degrees. The angle θ may also be slightly less than the angle of the corner to be sealed. For example, the angle θ may be about 89.8 degrees for use with a 90 degree corner. This may help ensure the seal 104 can be pressed tightly into such corner, particularly if the corner is not exactly the expected 90 degrees.

A first attachment portion 116 extends generally perpendicular from a first edge 117 of the interior surface 108 of the contact portion 106. The first attachment portion 116 includes latches 118A, 118B (sometimes collectively referred to herein as latches 118) for releasable attachment of the bracket 102 to an enclosure. As shown in FIG. 3, the first attachment portion 116 may extend from the first edge 117 of the interior surface 108 at an angle β of less than 90 degrees. This creates a preload, such that when the bracket 102 is installed to an enclosure, the first attachment portion 116 and the latches 118A, 118B grip the enclosure tightly. In some example embodiments, the angle β may be about 87 degrees. As seen in FIGS. 2 and 3, a second attachment portion 120 extends generally perpendicular from a second edge 121 of the interior surface 108 of the contact portion 106 opposite the first edge 117. The second attachment portion 120 including a latch 122 for releasable attachment of the bracket 102 to an enclosure. As shown in FIG. 2, a third attachment portion 124 extends generally perpendicular from the second edge 121 of the interior surface 108 of the contact portion 106. The third attachment portion 124 includes a latch 126 for releasable attachment of the bracket 102 to an enclosure.

The latches 118 include retaining hooks 119A and 119B (sometimes collectively referred to herein as retaining hooks 119). The retaining hook 119A can best be seen in FIG. 1 and retaining hook 119B can best be seen in FIG. 3. Each of the retaining hooks 119 latches over a protrusion of an enclosure to which it is to be mounted (not illustrated in FIGS. 1-4) to assist in retaining the bracket 102 to the enclosure.

As shown in FIG. 4, the interior surface 108 of the rigid bracket 102 includes a recess 128 configured to receive the flexible seal 104.

The flexible seal 104 will be described primarily with reference to FIGS. 5 and 6. The flexible seal includes a contact portion 130. The contact portion 130 has an interior surface 132 for contacting a corner of an enclosure and an exterior surface 134 for contacting the bracket 102 (and more particularly for contacting the recess 128 of the bracket 102 shown in FIG. 4). The interior and exterior surfaces 132, 134 are defined by a first arm 136 and a second arm 138. The first and second arms 136, 138 are generally planar shapes coupled to define angle α between the first arm 136 and the second arm 138 about the same as an angle defined by a corner of an enclosure to be sealed by the sealing assembly 100.

Figure 6:
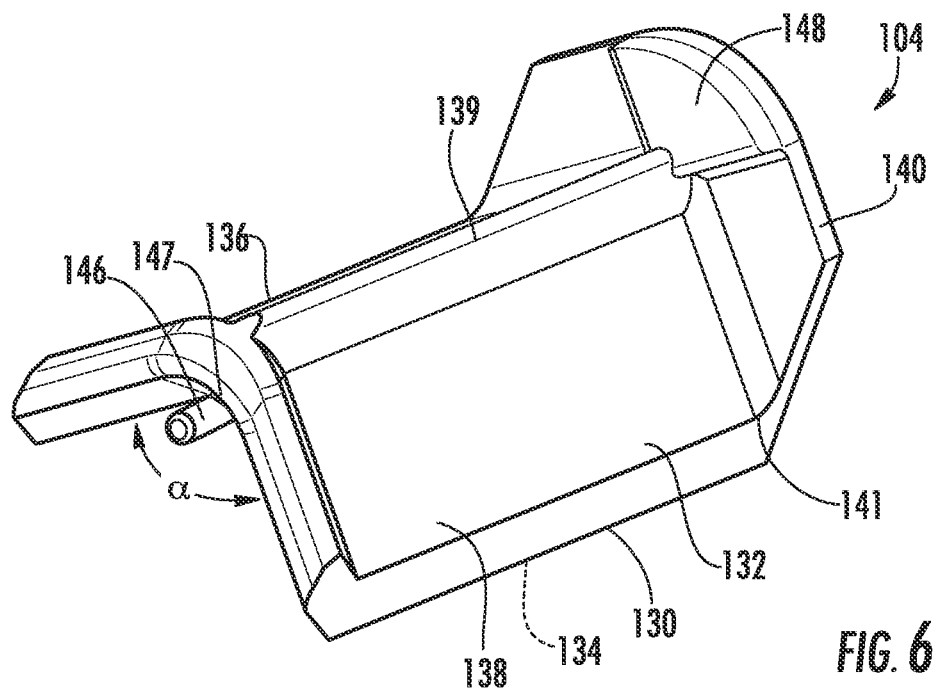
FIG. 6 is a top isometric view of the flexible seal of the example sealing assembly of FIG. 1.

The flexible seal 104 also includes a ridge 139 (best seen in FIGS. 1, 2 and 6). The ridge 139 extends outward from the interior surface 132. When the flexible seal 104 is attached to a corner of an enclosure, the ridge 139 may be forced against and/or into a gap in the corner. This may aid in achieving proper sealing of the corner. In other embodiments, the flexible seal 104 may not include the ridge 139 or may include a differently shaped, sized, etc. ridge 139.

The flexible seal 104 includes an attachment portion 140 extending generally perpendicular from a first edge 141 of the interior surface 132 of the contact portion 130. As seen in FIG. 5, the attachment portion 140 includes two pins 142A, 142B (sometimes collectively referred to herein as retaining pins 142). The pins 142 couple with apertures 144A, 144B (shown in FIG. 4 and sometimes collectively referred to herein as apertures 144) in the bracket 102 to mount the seal 104 to the bracket 102. More or fewer, including no, pins 142 and apertures 144 may be used in the sealing assembly 100.

The attachment portion 140 also includes a triangular protrusion 148. When the flexible seal 104 is attached to a corner of an enclosure, the triangular protrusion 148 may be forced against and/or into a gap in the corner. This may aid in achieving proper sealing of the corner. In other embodiments, the flexible seal 104 may not include the triangular protrusion 148.

Figure 5:
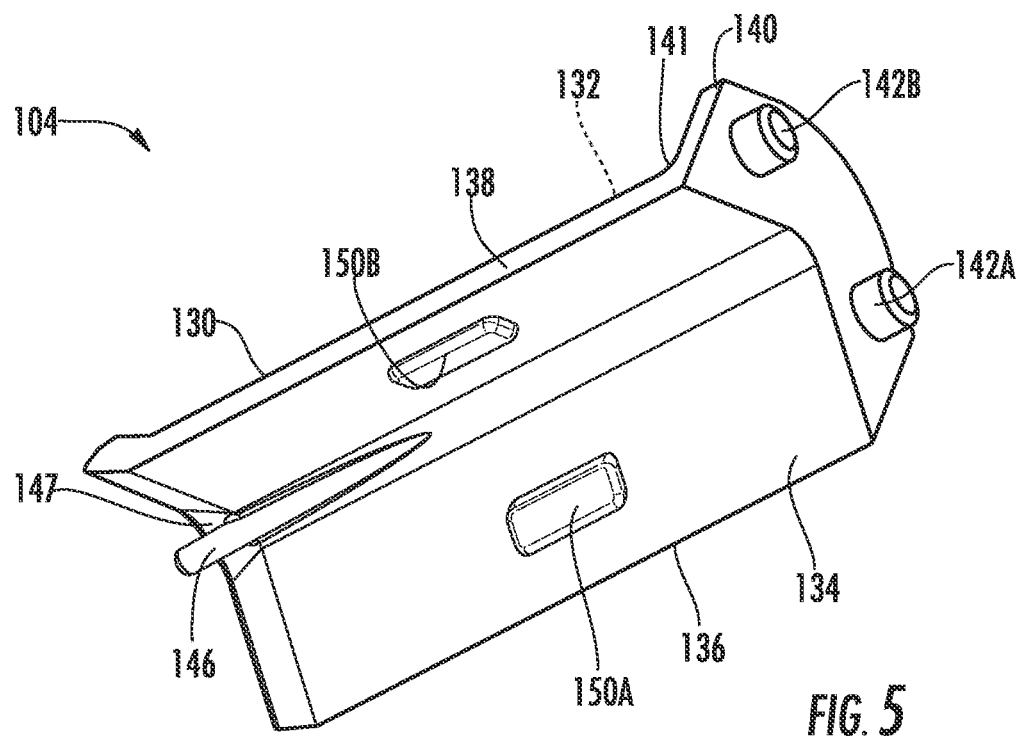
FIG. 5 is a bottom isometric view of the flexible seal of the example sealing assembly of FIG. 1.

As shown in FIGS. 5 and 6, the seal 104 includes an additional pin 146 extending from the edge 147 of the flexible seal 104 opposite the attachment portion 140. The bracket 102 includes an aperture 148 (as best seen in FIG. 4) for receiving the additional pin 146 to mount the seal 104 to the bracket 102. More or fewer, including no, additional pins 146 and apertures 148 may be used in the sealing assembly 100.

As best seen in FIG. 5, the exterior surface 134 of the flexible seal 104 includes two alignment tongues 150A and 150B (sometimes collectively referred to herein as alignment tongues 150) extending from the exterior surface 134. The interior surface 108 of the bracket 102 (and more particularly the recess 128 shown in FIG. 4) includes grooves 152A and 152B (sometimes collectively referred to herein as grooves 152) for receiving the alignment tongues 150 to assist with maintaining the seal 104 in proper alignment with the bracket 102.

Figure 6A:
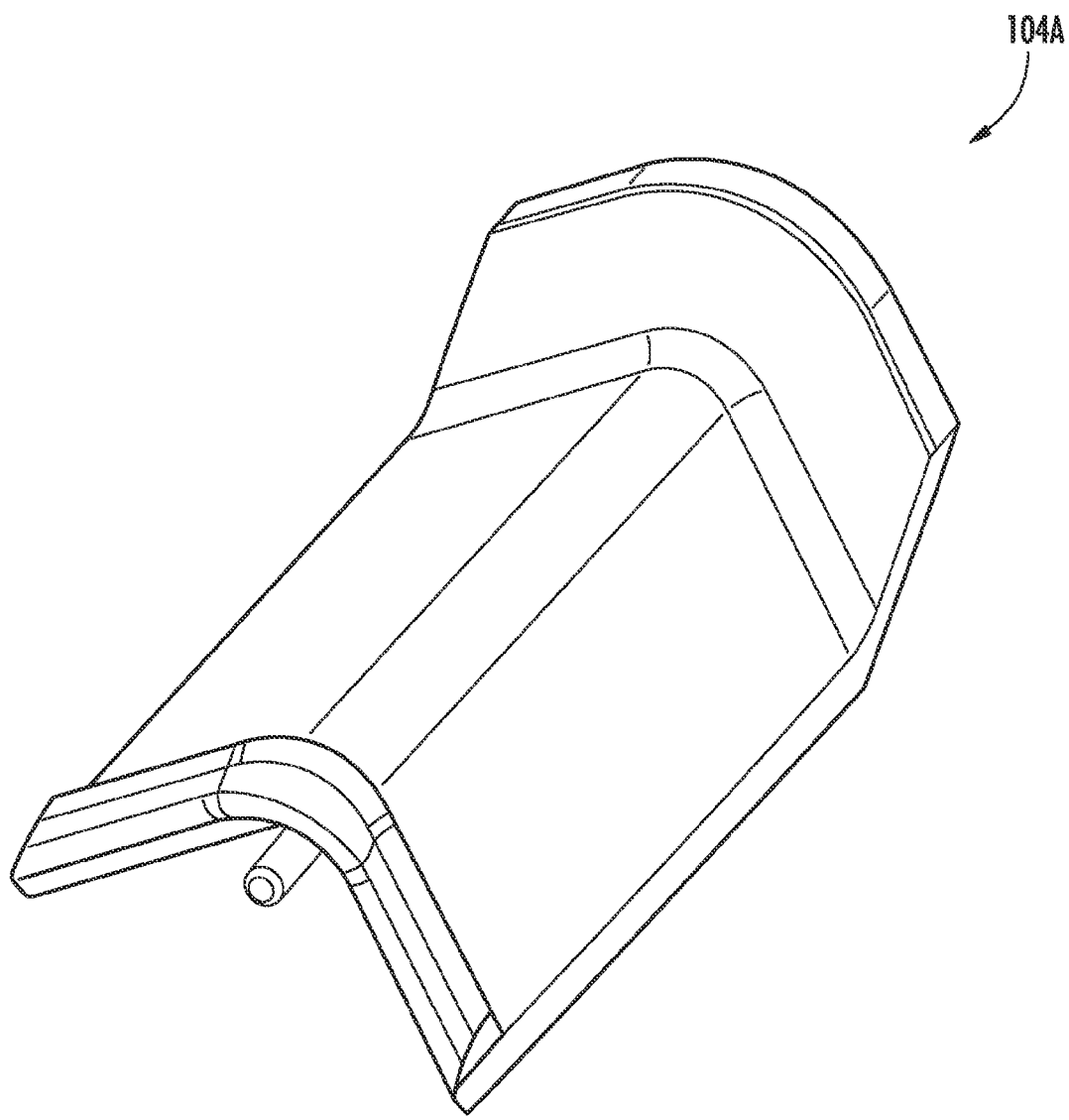
FIG. 6A is a top isometric view of another example flexible seal for use in the example sealing assembly of FIG. 1.

FIG. 6A illustrates another example embodiment of a flexible seal 104A. The flexible seal 104A is generally the same as the flexible seal 104 discussed above. The flexible seal 104A, however, does not include the ridge 139 or the triangular protrusion 148 of flexible seal 104. In all other particulars discussed above, the flexible seal 104A is the same as the flexible seal 104. The flexible seal 104A may be used in place of the flexible seal 104 in the sealing assembly 100.

Sealing assemblies according to the aspects disclosed herein may be used with any type of enclosure. Furthermore, they may be used with corners of varying angles and varying purposes. For, example, the enclosure may be a telecommunications enclosure, the corner may be a corner of a doorframe of the telecommunications enclosure, and the angle of the corner may be about ninety degrees.

According to one aspect of the present disclosure a telecommunications enclosure includes a plurality of frame members. At least two of the plurality of frame members are coupled together to define a corner of a doorframe of the telecommunications enclosure. The telecommunications enclosure includes a corner seal assembly coupled to the telecommunications enclosure to seal a gap in the corner of the doorframe. The corner seal assembly includes a flexible seal positioned in the corner and a rigid bracket coupled to the flexible seal and coupled to the at least two of the plurality of frame members adjacent the corner. The rigid bracket retains and compresses the flexible seal into the corner of the doorframe.

Figure 7:
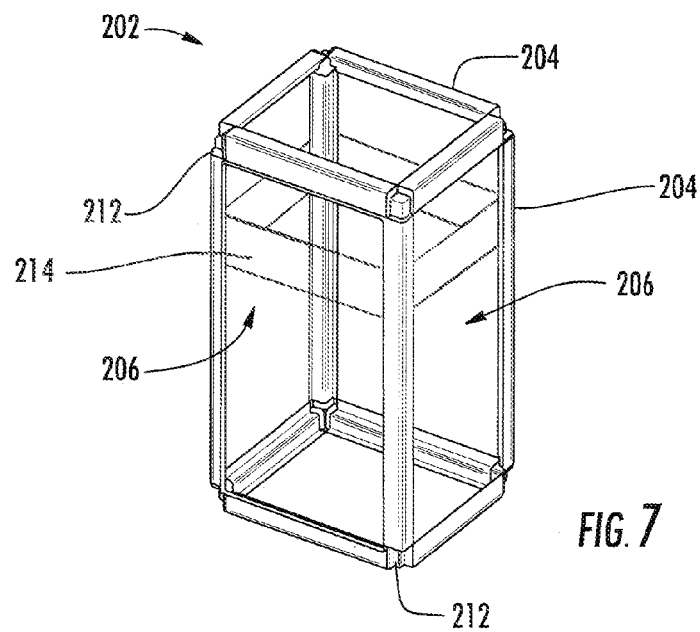
FIG. 7 is an isometric view of a frame for a telecommunications enclosure according to another example embodiment of this disclosure.
Figure 8:
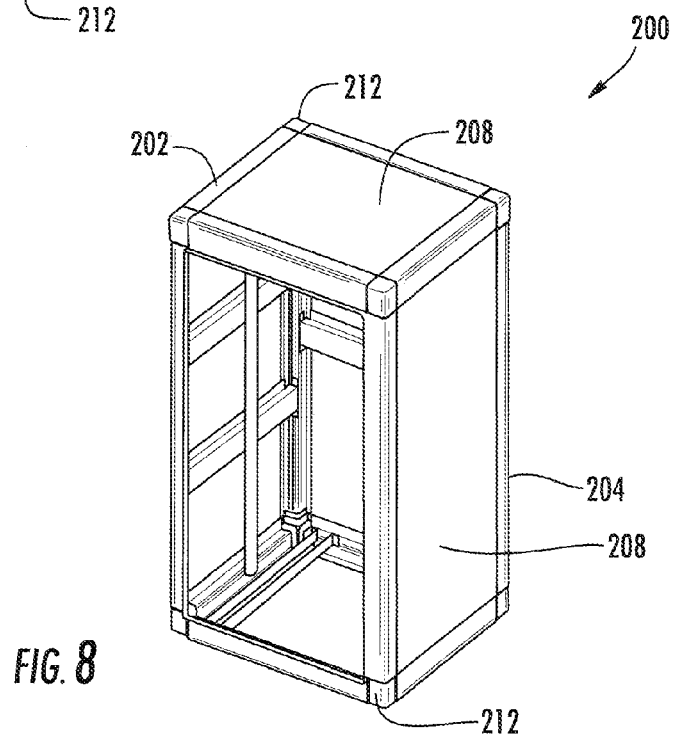
FIG. 8 illustrates a telecommunications enclosure including the frame of FIG. 7.

An example telecommunications enclosure 200 is illustrated in FIGS. 7 and 8. The enclosure 200 (in FIG. 8) includes a frame 202 (shown in FIG. 7). The frame 202 includes a plurality of frame members 204. The frame members 204 define several openings 206. Panels 208 are attached to the frame members 204 and overlap, i.e. cover, the openings 206.

The frame members 204 may be any suitable length to form an enclosure. Accordingly, a different size enclosure 200 may be constructed simply by using different lengths of frame members 204. The frame members 204 may also be cut to shorter length members from a longer frame member. As will be discussed in more detail below, the frame members 204 may all have the same profile shape, or the enclosure may include frame members 204 with two or more different profiles, as desired.

The frame members 204 are connected together to form the frame 202 using several corner copulas 212. Each corner copula 212 (sometimes referred to as a corner connector) is connected to three frame members 204. The corner copulas 212 are connected to the frame members 204 using fasteners (e.g., screws, bolts, etc.). As can be seen in FIG. 7, a rectangular or square shaped enclosure 200 uses eight horizontal frame members 204 and four vertical frame members 204. These twelve frame members are connected using eight corner copulas 212.

Figure 9:
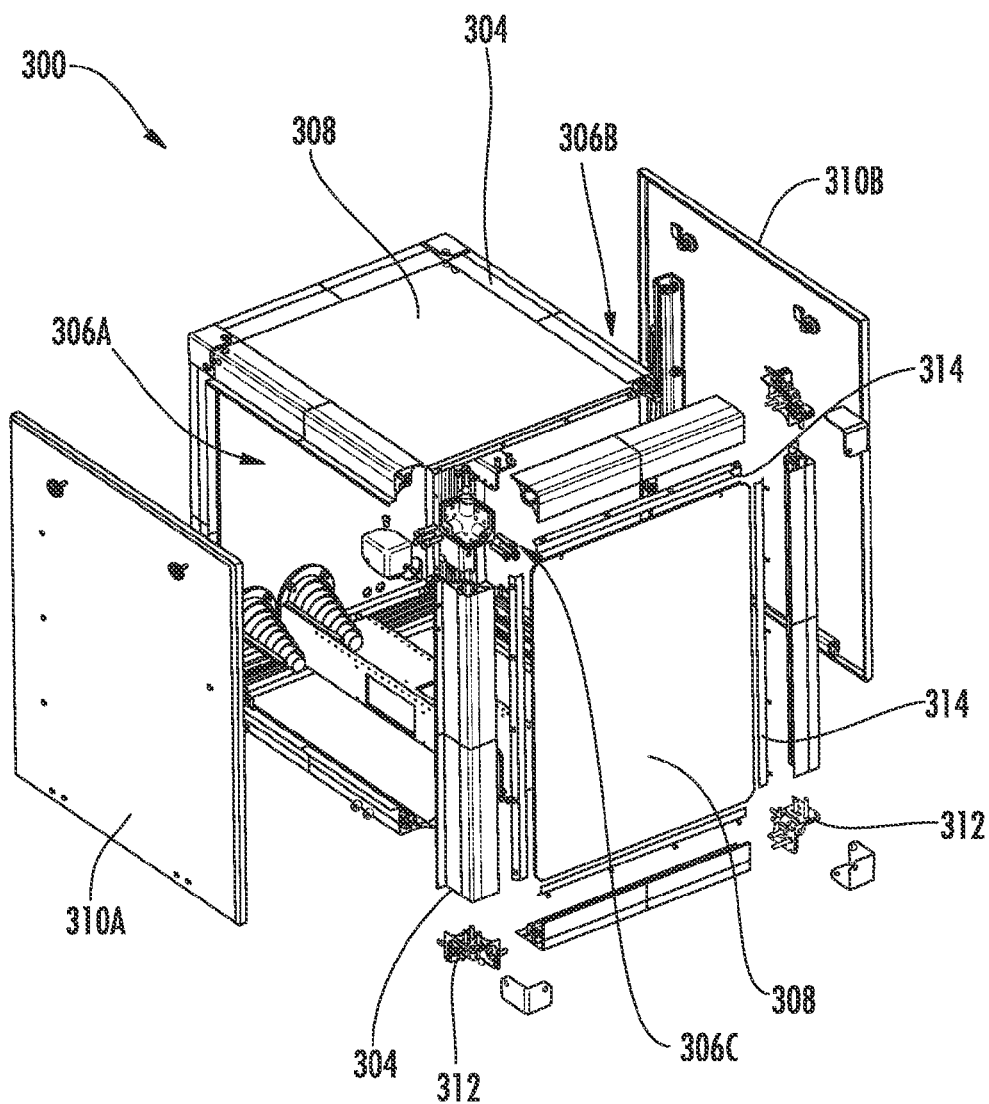
FIG. 9 is a partially exploded view of a telecommunications enclosure according to another example embodiment of this disclosure.

A partially exploded view of another example telecommunications enclosure 300 is illustrated in FIG. 9. The enclosure 300 includes a plurality of frame members 304 that define several openings (three of which are identified in FIG. 9 as openings 306A, 306B and 306C). The frame members 304 are connected together by corner copulas 312. Panels 308 are attached to the frame members 304 and cover four of the openings including opening 306C. The openings 306A, 306B are covered by doors 310A and 310B (collectively, doors 310). The doors 310 are attached to the frame members 304 and cover the openings 306A, 306B when closed. The doors 310 can be opened to access an interior of the assembled enclosure 300 through the openings 306A, 306B.

Figure 10:
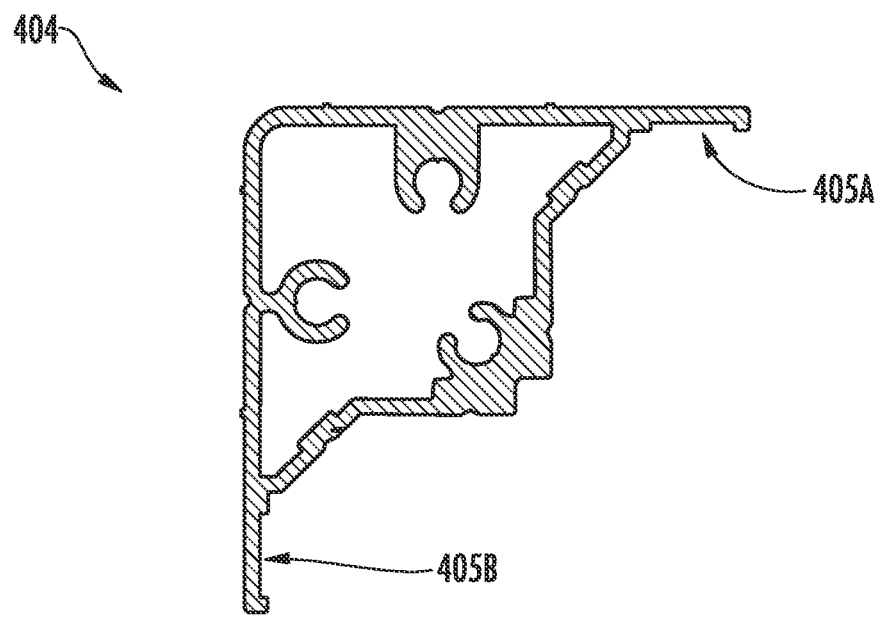
FIG. 10 is a top view of a frame member for a telecommunications enclosure according to another example embodiment of this disclosure.
Figure 11:
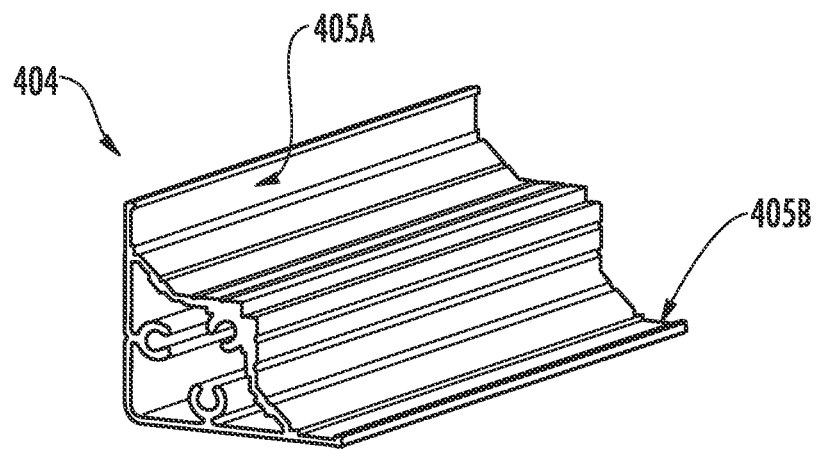
FIG. 11 is an isometric view of the frame member of FIG. 10.

Several features of the enclosures 200, 300 contribute to the enclosures 200, 300 being resistant to weather, i.e. weather tight. A gasket (not illustrated in FIGS. 7-9) is positioned between a corner copula 212, 312 and the frame member to which the corner copula 212, 312 is attached. Accordingly, for the enclosure 300, three gaskets are used with each corner copula 312 for a total of twenty-four corner gaskets. Further, the panels 208, 308 attach to the frame members 204, 304 from inside the frame of the enclosure 200, 300. A gasket channel (not visible in FIGS. 7-9, but see, for example, gasket channel 405A and 405B in FIGS. 10 and 11) in which a gasket (not illustrated in FIGS. 7-9) is disposed is located on an interior surface of each frame member 204, 304. Retainers 314 (as shown in FIG. 9) are attached to the frame members 204, 304 to hold the panels 208, 308 in place covering an opening in the enclosure 200, 300. The retainers also bias the panels 208, 308 against the gasket to create a seal around the opening 306.

Figure 12:
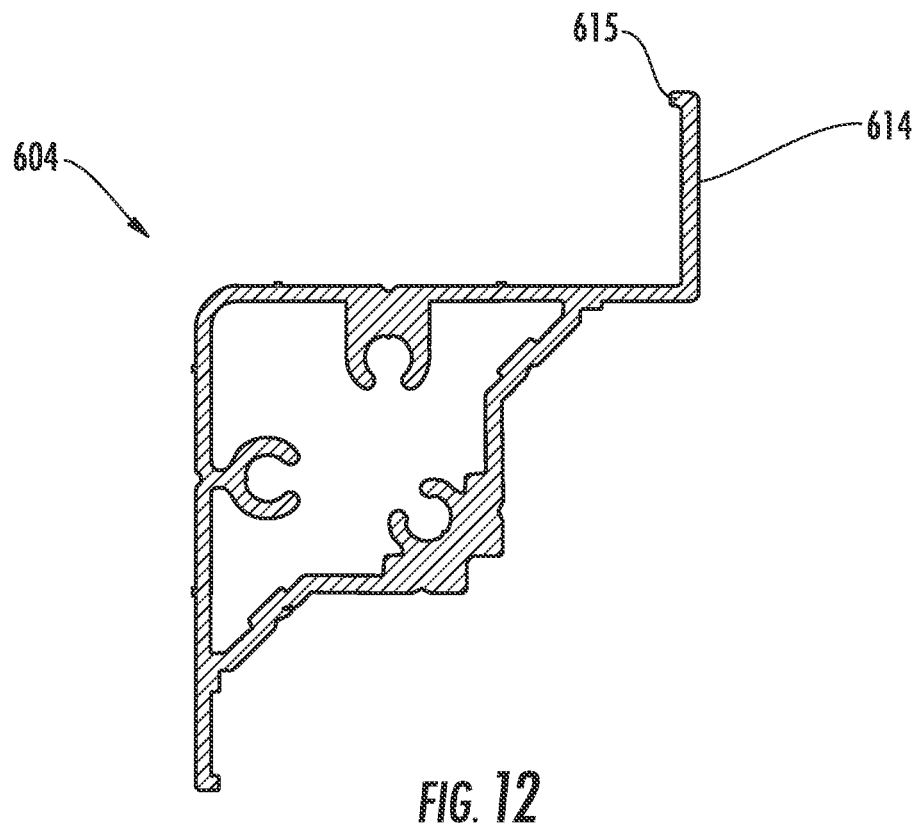
FIG. 12 is a top view of a frame member including a gutter flange for a telecommunications enclosure according to another example embodiment of this disclosure.
Figure 13:
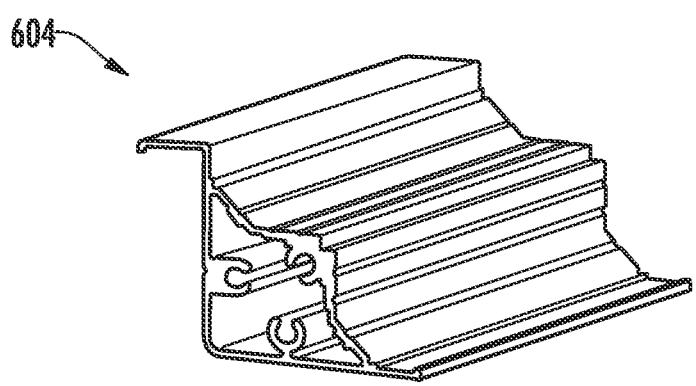
FIG. 13 is an isometric view of the frame member of FIG. 12.
Figure 14:
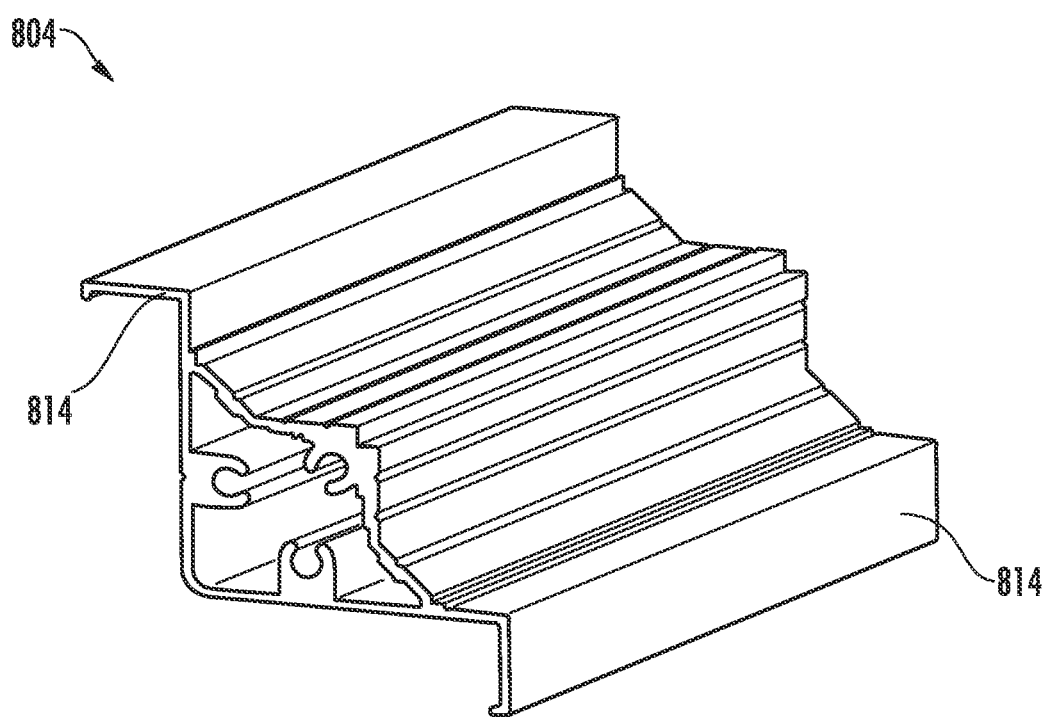
FIG. 14 is a top view of a frame member including two gutter flanges for a telecommunications enclosure according to another example embodiment of this disclosure.

FIGS. 10 through 14 illustrate three example frame members 404, 604, 804 for use in a telecommunications enclosure (e.g., enclosures 200, 300, etc). The frame member 604 in FIGS. 12 and 13 is similar to the frame member 404, but includes a protruding gutter flange 614. The gutter flange includes a protruding lip 615. The frame member 604 is typically used to define an opening for a door in an enclosure. In an assembled telecommunication enclosure, the gutter flange 614 extends beyond the opening to provide additional protection against water, debris, etc. entering the enclosure. The frame member 804 in FIG. 14 includes two protruding gutter flanges 814. The frame member 804 is typically used in an enclosure with an opening on both sides of the frame member 804 for which a gutter flange 814 is desired.

The frame members 404, 604, 804 may be constructed of any suitable material. For example, the frame members 404, 604, 804 may be aluminum, steel, etc. The frame members 404, 604, 804 may be made by any suitable process. For example, the frame members may be extruded, cast, molded, machined, welded, or constructed using a combination of the foregoing techniques.

Figure 15:
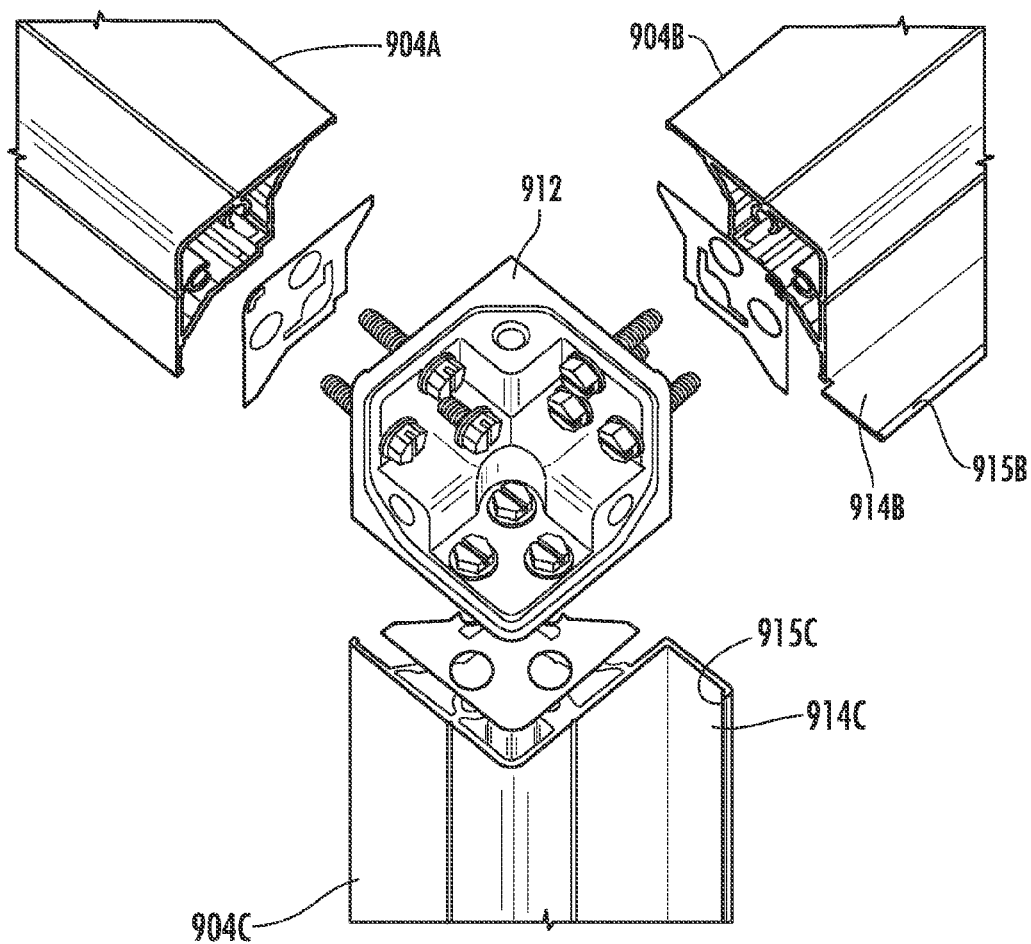
FIG. 15 is an exploded view of a portion of a telecommunications enclosure including a corner copula coupled to three frame members according to another example embodiment of this disclosure.
Figure 16:
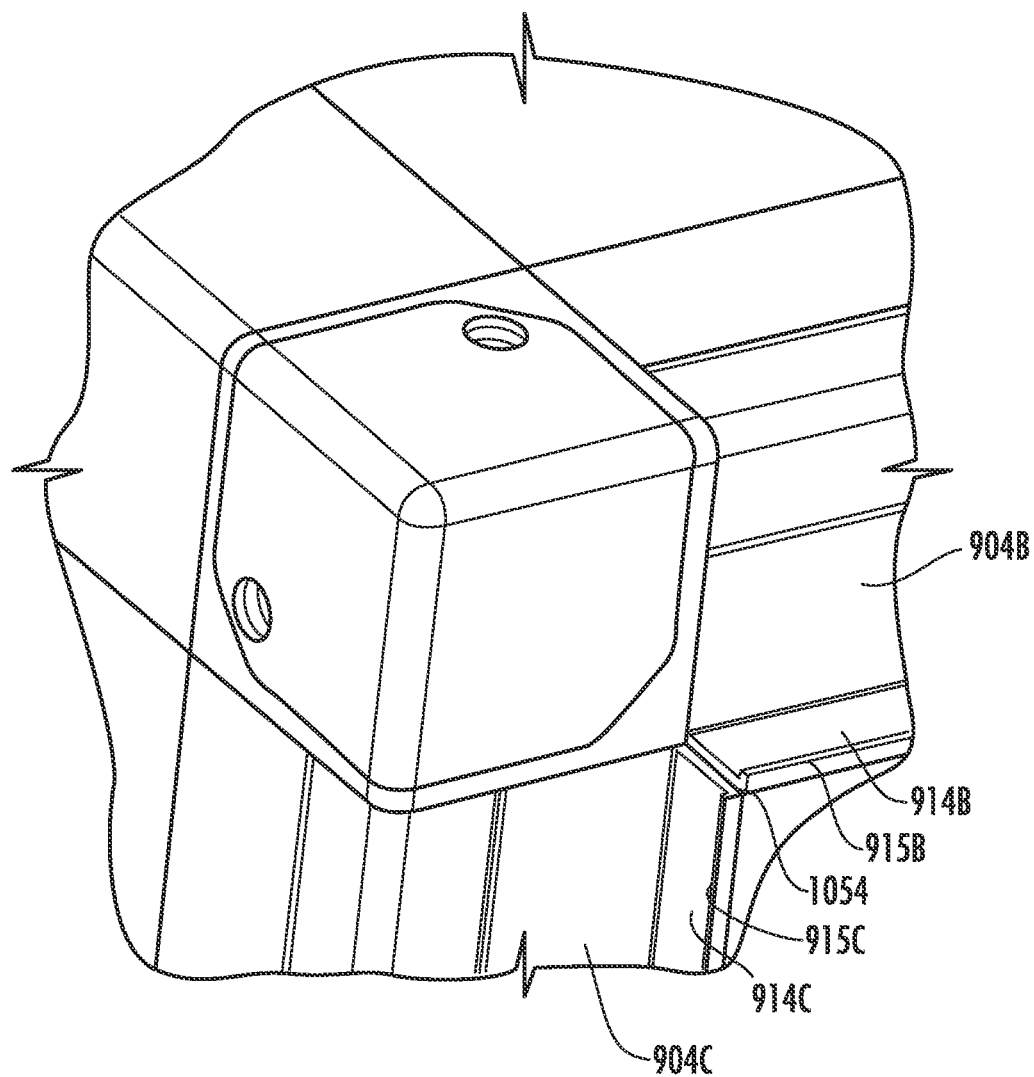
FIG. 16 is an isometric view of a portion of a telecommunications enclosure including a corner copula coupled to three frame members according to another example embodiment of this disclosure.

FIGS. 15 and 16 illustrate a portion of an example telecommunications enclosure (e.g., enclosure 200, 300, etc.). In FIG. 15, the part of the telecommunications enclosure is illustrated in exploded view. The part of the telecommunications enclosure is shown assembled in FIG. 16. Three frame members 904A, 904B and 904C are connected by a corner copula 912. Members 904B and 904C include gutter flanges 914B, 914C (sometimes collectively referred to herein as gutter flanges 914) with protruding lips 915B, 915C (sometimes collectively referred to herein as protruding lips 915) and cooperatively define one corner of a doorway, opening, etc. The intersection of the flanges 914 in the corner forms a joint 1054 (shown in FIG. 16) that, depending on manufacturing tolerances, assembly accuracy, etc., may result in a gap through which water, debris, etc. may enter the enclosure.

Figure 17:
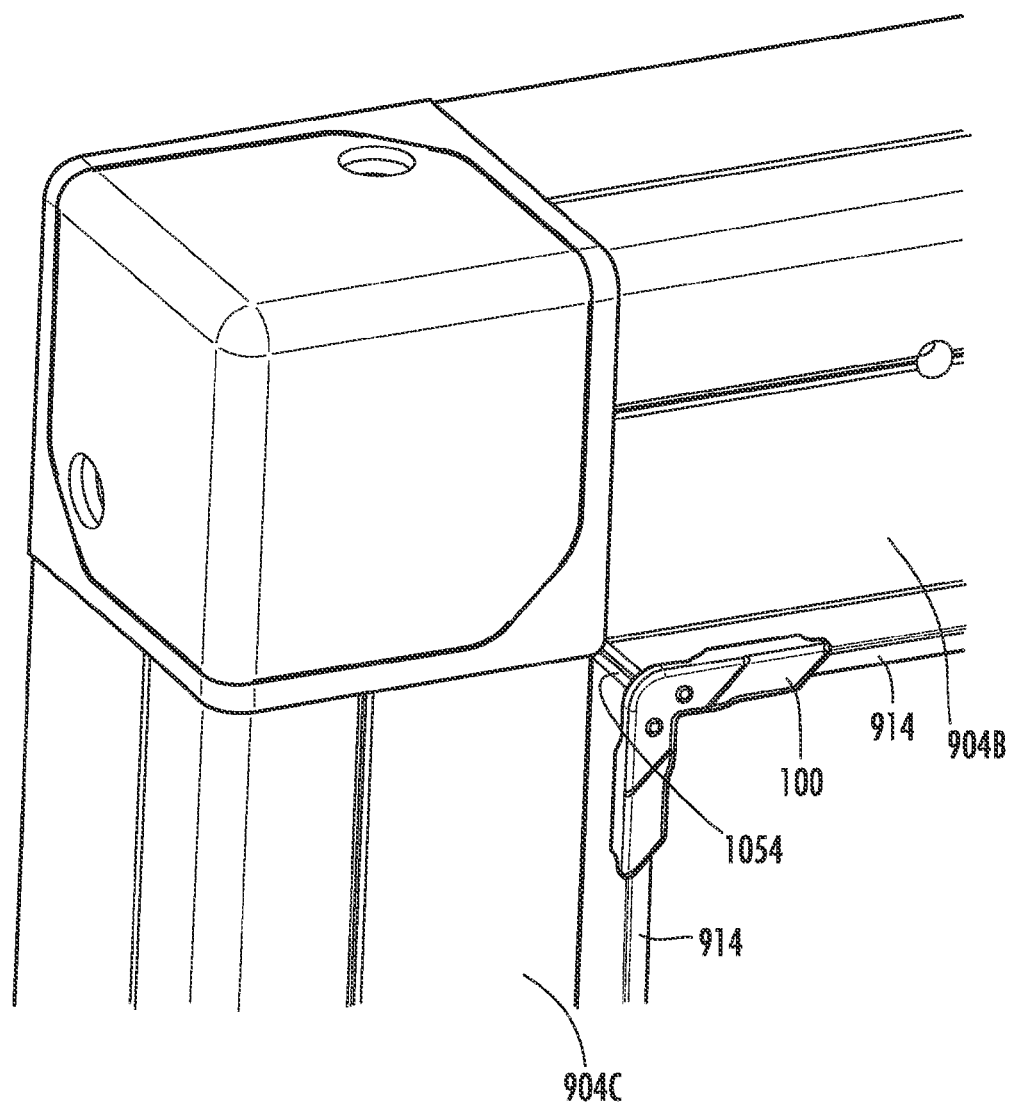
FIG. 17 is an isometric view of a portion of the telecommunications enclosure of FIG. 16 with the sealing assembly of FIG. 1 attached.
Figure 18:
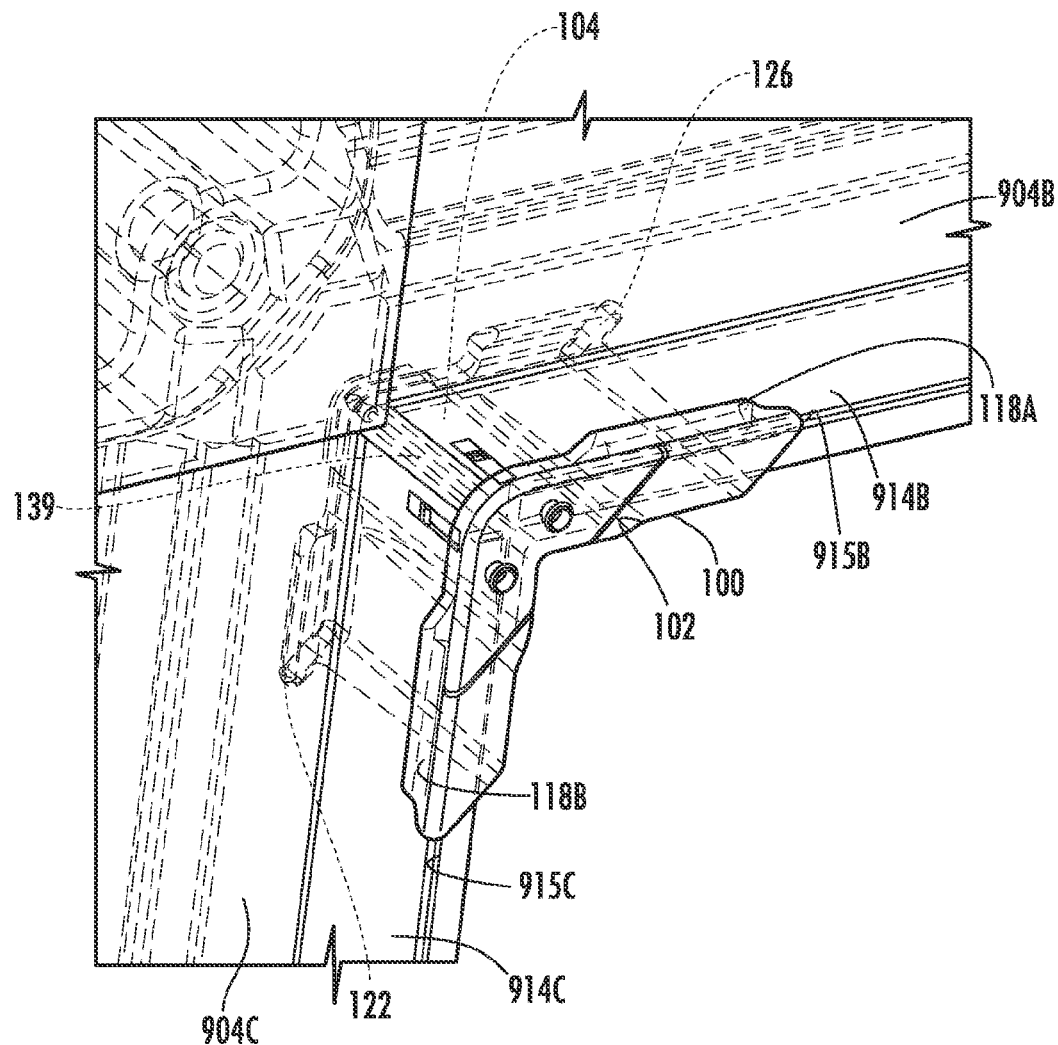
FIG. 18 is a see-through view of the telecommunications enclosure and sealing assembly of FIG. 17.

FIGS. 17 and 18 illustrate the same portion of the enclosure as FIGS. 16 and 17, but with a sealing assembly 100 coupled to the corner. The coupling of the sealing assembly 100 to the portion of the enclosure will be described primarily with reference to FIG. 18. The sealing assembly 100 includes the bracket 102 and the flexible seal 104 coupled thereto. The seal 104 is held tight against the corner by the bracket 102. The ridge 139 is forced against and/or into the joint 1054. The latches 118 of the first attachment portion 116 are latched onto the outside (i.e., the side facing out of FIGS. 17 and 18) of the gutter flanges 914. The retaining hooks 119 (not illustrated in FIGS. 17 and 18) latch over the protruding lips 915 to hold the bracket in position. The latches 122, 126 of the second and third attachment portions 120, 124 (not identified by reference number in FIG. 18) are forced against flat sections of the interior of frame members 904C and 904B, respectively. The combination of the latches 122, 126 applying a force against the interior of the frame members 904B, 904C and the latches 118 applying a force to the outside of the frame members 904B, 904C in the opposite direction to that applied by the latches 122, 126 holds the bracket in position in the corner. The bracket 102 (and accordingly the sealing assembly 100) may be removed from the enclosure by flexing the bracket 102 to release the retaining hooks 119 from the protruding lip 915 (such as by directly flexing the latches 118 over the protruding lip 915, etc.). In this manner, the corner may be sealed by the removable sealing assembly without use of adhesive or sealant.

Telecommunications enclosures described above may be used in an interior or exterior location. The enclosures may house any suitable telecommunications equipment such as, for example, switching equipment, batteries, wireless and wireline communication equipment, power supplies, etc. For example, as shown in FIG. 7, the telecommunications enclosure 200 includes telecommunications equipment 214.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sealing assembly for sealing a corner of an enclosure, the sealing assembly comprising:
    a flexible seal; and
    a substantially rigid bracket, the bracket including an aperture, a first latch, and a second latch, the first and second latches configured for releasable connection to the enclosure adjacent a corner of the enclosure with the first and second latches on opposing sides of said corner, the bracket configured to provide a force to couple the flexible seal to said corner when the bracket is attached to said enclosure,
    the flexible seal including a first surface for coupling to the corner of the enclosure, and a second surface opposite the first surface, at least a portion of the second surface configured for contact with the bracket, the flexible seal including an outwardly extending connector for releasable connection to the bracket, the outwardly extending connector including a pin, the aperture of the bracket configured for receiving the pin.

2. The sealing assembly of claim 1 wherein the bracket and the flexible seal are each monolithically formed.

3. The sealing assembly of claim 2 wherein the bracket is monolithically formed of a plastic.

4. The sealing assembly of claim 2 wherein the flexible seal is monolithically formed of an elastomer.

5. The sealing assembly of claim 1 wherein the bracket includes a first arm and a second arm defining an interior surface for positioning adjacent the second surface of the flexible seal, wherein the first arm and the second arm of the bracket define a first angle, and the first angle is less than a second angle defined by the corner of said enclosure to be sealed by the sealing assembly.

6. A telecommunications enclosure including telecommunications equipment and the sealing assembly of claim 1.

7. The sealing assembly of claim 1 wherein the pin is a first outwardly extending connector, wherein the flexible seal includes a second outwardly extending connector including an alignment tongue, and wherein the bracket includes at least one groove configured for receiving the alignment tongue.

8. A sealing assembly for sealing a corner of an enclosure, the sealing assembly comprising:
    a rigid bracket, the rigid bracket including a contact portion, a first attachment portion, and a second attachment portion, the contact portion including an interior surface for orienting facing toward said corner of said enclosure and an exterior surface for orienting facing away from said corner of said enclosure when the sealing assembly is mounted to said enclosure, the interior and exterior surfaces defined by a first arm coupled a second arm, the first and second arms being generally planar shapes coupled to define an angle between the first arm and the second arm about the same as an angle defined by the corner of said enclosure to be sealed by the sealing assembly, the first attachment portion extending generally perpendicular from a first edge of the interior surface of the contact portion, the first attachment portion including at least one latch for releasable attachment of the rigid bracket to the enclosure, the second attachment portion extending generally perpendicular from a second edge of the interior surface of the contact portion opposite the first edge of the interior surface of the contact portion, the second attachment portion including at least one latch for releasable attachment of the rigid bracket to the enclosure; and
    a flexible seal, the flexible seal including a contact portion and an attachment portion, the contact portion including an interior surface for contacting the corner of said enclosure and an exterior surface for contacting the rigid bracket when the sealing assembly is mounted to said enclosure, the interior and exterior surfaces defined by a first arm coupled a second arm, the first and second arms being generally planar shapes coupled to define an angle between the first arm and the second arm about the same as an angle defined by the corner of said enclosure to be sealed by the sealing assembly, the attachment portion extending generally perpendicular from a first edge of the interior surface of the contact portion, the attachment portion including at least one connector for releasably coupling the flexible seal to the rigid bracket.

9. The sealing assembly of claim 8 wherein the interior surface of the rigid bracket includes a recess configured to receive the flexible seal.

10. The sealing assembly of claim 8 wherein the angle defined by the first and second arms of the rigid bracket is less than an angle defined by the corner of said enclosure to be sealed by the sealing assembly.

11. The sealing assembly of claim 10 wherein the first attachment portion extends from the first edge of the interior surface of the contact portion at an angle of less than ninety degrees to the interior surface to preload the bracket for attachment to the sealing assembly.

12. The sealing assembly of claim 8 wherein the at least one connector on the attachment portion of the flexible seal includes a first pin, and the first attachment portion of the rigid bracket includes a first aperture for receiving the first pin.

13. The sealing assembly of claim 12 wherein the flexible seal further comprises a second pin extending from an edge of the flexible seal opposite the attachment portion of the flexible seal, and the rigid bracket includes a second aperture for receiving the second pin.

14. The sealing assembly of claim 13 wherein the exterior surface of the flexible seal includes at least one alignment tongue extending from the exterior surface, and the interior surface of the rigid bracket includes at least one groove for receiving the alignment tongue.

15. The sealing assembly of claim 8 wherein the rigid bracket includes a third attachment portion extending generally perpendicular from the second edge of the interior surface of the contact portion, the third attachment portion including at least one latch for releasable attachment of the rigid bracket to the enclosure, the second attachment portion extending from the first arm of the rigid bracket and the third attachment portion extending from the second arm of the rigid bracket.

16. The sealing assembly of claim 8 wherein the interior surface of the flexible seal includes a ridge along an intersection of the first and second arms.

17. A telecommunications enclosure comprising:
    telecommunications equipment housed within the telecommunications enclosure;
    a plurality of frame members, at least two of the plurality of frame members coupled together to define a corner of a doorframe of the telecommunications enclosure; and
    a corner seal assembly coupled to the telecommunications enclosure to seal a gap in the corner of the doorframe, the corner seal assembly comprising a flexible seal positioned in the corner, and a rigid bracket coupled to the flexible seal, the flexible seal including a plurality of connectors, the rigid bracket including a plurality of latches and a plurality of mating connectors for coupling with the connectors of the flexible seal, the rigid bracket releasably attached to said two of the plurality of frame members adjacent the corner via the latches, the rigid bracket retaining and compressing the flexible seal into the corner of the doorframe.

18. The telecommunications enclosure of claim 17 wherein the corner seal assembly is coupled to the telecommunications enclosure without adhesive.

19. The telecommunications enclosure of claim 17 wherein the connectors of the flexible seal include at least one pin and wherein the mating connectors of the rigid bracket include at least one aperture for coupling with the least one pin.

20. The telecommunications enclosure of claim 17 wherein the connectors of the flexible seal include at least one alignment tongue and wherein the mating connectors of the rigid bracket include at least one groove for coupling with the at least one alignment tongue.

21. A telecommunications enclosure comprising:
    telecommunications equipment housed within the telecommunications enclosure;
    a plurality of frame members, at least two of the plurality of frame members coupled together to define a corner of a doorframe of the telecommunications enclosure; and
    a corner seal assembly coupled to the telecommunications enclosure without adhesive to seal a gap in the corner of the doorframe, the corner seal assembly comprising a flexible seal positioned in the corner, and a rigid bracket coupled to the flexible seal and coupled to said two of the plurality of frame members adjacent the corner, the rigid bracket retaining and compressing the flexible seal into the corner of the doorframe.

22. The telecommunications enclosure of claim 7 wherein the flexible seal includes an outwardly extending connector and wherein the rigid bracket includes a mating connector for coupling with the outwardly extending connector of the flexible seal.

23. The telecommunications enclosure of claim 22 wherein the outwardly extending connector of the flexible seal includes a pin and wherein the mating connector of the rigid bracket includes an aperture for coupling with the pin.

24. The telecommunications enclosure of claim 22 wherein the outwardly extending connector of the flexible seal includes an alignment tongue and wherein the mating connector of the rigid bracket includes a groove for coupling with the alignment tongue.

\* \* \* \* \*

UNITED STATES PATENT AND TRADEMARK OFFICE
CERTIFICATE OF CORRECTION

| | | |
|---|---|---|
| PATENT NO. | : 8,562,084 B2 | Page 1 of 1 |
| APPLICATION NO. | : 12/887961 | |
| DATED | : October 22, 2013 | |
| INVENTOR(S) | : Chen et al. | |

It is certified that error appears in the above-identified patent and that said Letters Patent is hereby corrected as shown below:

In the Claims

Col. 12, line 18, replace "7" with "21."

Signed and Sealed this
Eighteenth Day of February, 2014

Michelle K. Lee
*Deputy Director of the United States Patent and Trademark Office*